United States Patent [19]

Kos et al.

[11] 4,247,874
[45] Jan. 27, 1981

[54] PHOTOCONDUCTOR DEVICE FOR IMAGING A LINEAR OBJECT

[75] Inventors: Steven Kos, Hazeldean; David R. Baraff, Ottawa, both of Canada

[73] Assignee: Northern Telecom Limited, Montreal, Canada

[21] Appl. No.: 946,559

[22] Filed: Sep. 28, 1978

[51] Int. Cl.³ .................. H04N 1/02; H04N 3/14; H01J 40/14
[52] U.S. Cl. ..................... 358/294; 358/213; 250/211 T
[58] Field of Search .............. 358/213, 212, 209, 285, 358/293, 294; 250/200, 211 J; 235/460

[56] References Cited

U.S. PATENT DOCUMENTS

| | | | |
|---|---|---|---|
| 3,317,712 | 5/1967 | Silverman | 358/213 |
| 3,995,302 | 11/1976 | Amelio | 358/213 |
| 4,009,333 | 2/1977 | Berger et al. | 358/213 |
| 4,012,587 | 3/1977 | Ochi et al. | 358/213 |
| 4,040,092 | 8/1977 | Carnes | 358/213 |

Primary Examiner—Robert L. Griffin
Assistant Examiner—Edward L. Coles
Attorney, Agent, or Firm—Sidney T. Jelly

[57] ABSTRACT

A photoconductive device for imaging a linear object has a plurality of photoconductive elements, extending in a line, on a substrate, with first and second patterns of electrical conductors, a pattern on each side of the line. Connections are made to the elements. The conductor patterns are formed as columns on one side of the line and as rows on the other side to provide connections between columns and elements and rows and elements such that the number of external connections is minimized. By applying a voltage to a column, and then connecting a detector current sequentially to each row, and repeating for each column, the current flowing through each element can be determined and a signal generated related to the illumination of each element. The elements can be a continuous bar of photoconductive material.

4 Claims, 3 Drawing Figures

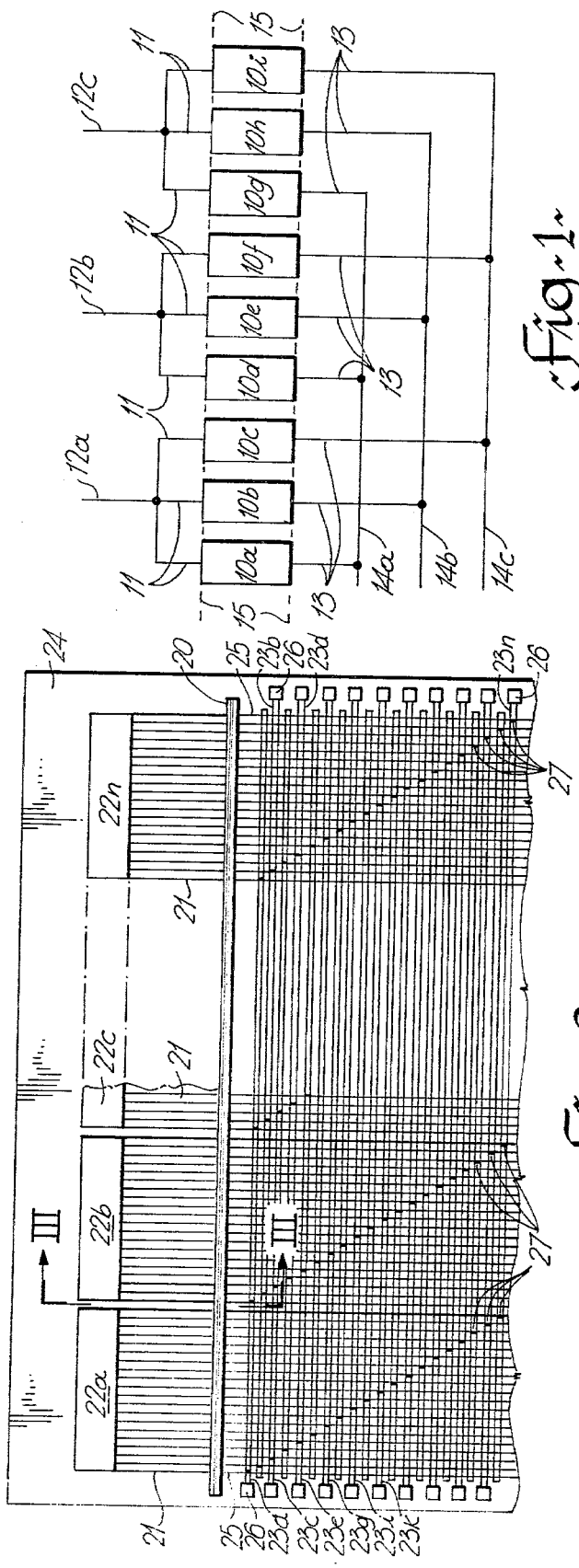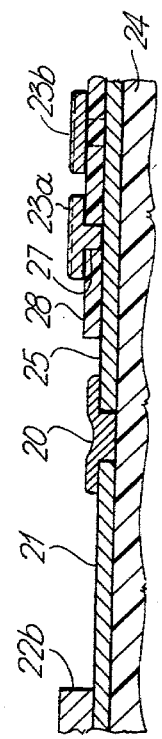

PHOTOCONDUCTOR DEVICE FOR IMAGING A LINEAR OBJECT

BACKGROUND OF THE INVENTION

This invention relates to a photoconductor device for imaging a linear object and is particularly applicable to line imaging in such applications as facsimile read and print systems.

Conventionally, in a reading, or imaging device, the object is imaged onto a detector array such as a charge-coupled device (CCD) array. Such systems are expensive.

SUMMARY OF THE INVENTION

The present invention provides a device which is much cheaper to produce. The device comprises a linear photo-conductive member and associated conductors and connectors arranged as a matrix, in rows and columns. The photoconductive member can be a continuous bar of photoconductive material, or a plurality of closely spaced separate elements of photoconductive elements. A detector circuit is associated with the device.

BRIEF DESCRIPTION OF THE DRAWINGS

The invention will be readily understood by the following description of certain embodiments, by way of example, in conjunction with the accompanying drawings, in which:

FIG. 1 is a diagrammatic plan view of part of an array;

FIG. 2 is a plan view of one form of photoconductive member and associated conductor patterns;

FIG. 3 is a typical cross-section to a greatly enlarged scale, on the line III—III of FIG. 2.

DESCRIPTION OF THE PREFERRED EMBODIMENTS

FIG. 1 illustrates, very diagrammatically, a section of a device or array. A plurality of photoconductive elements 10a to 10n extend in a line. To one side are made connections via connectors 11, which are arranged in columns, in the present example three connectors 11 forming a column. To each column is connected a conductor 12a, 12b and 12c. On the other side of the line of elements 10 are connectors 13. In the example illustrated the connectors 13 are connected to conductors 14a, 14b and 14c in rows, three elements 10 to each row.

As stated, FIG. 1 is a section of a device and normally many more elements 10 would be provided. For example, for reading of a line of print on a page there would be 1600 elements assuming a line 8" long and a resolution of 200 lines per inch. These would be connected, via connectors 11 and 13 and conductors 12 and 14 as a 40×40 matrix, that is 40 rows and 40 columns. Each row would connect to 40 elements and each column would connect to 40 elements.

While the elements 10 are shown as separate from each other in FIG. 1, the elements are preferably formed as a continuous bar, as indicated by the dotted lines 15. The continuous bar may be scribed, as by a laser, to reduce the thickness of the bar between elements.

A device can operate as follows. Column 12a would be taken to voltage V, typically 20 V. columns 12b, 12c—12n would be grounded. A detector circuit would look at the currents flowing through the elements 10a, 10b and 10c. Typical currents would be 2.0 ma (10 K) in the on state to 0.2 ma (100 K) in the off state, the on and off states depending upon whether or not light impinged on the elements. Thus by sequentially "looking" at the elements it would be possible to produce signals, indicative of the on or off state of an element, thus indicative of a light or dark spot on the line being read or scanned and these signals can then be transmitted to a printer.

Some indication of the sensitivity and accuracy of the system is as follows. Typical print reflectivities exhibit contrast ratios of 10:1, although in the case of poor print it may be as low as 5:1. The resistivity is approximately inversely proportional to light power and will also be in the ratio of 5:1 in the poor print example. Thus on white prints the resistance will be near 10,000 ohms and on dark prints the resistivity will be near 50,000 ohms. As a worst case analysis, with column 12a raised to 20 V and the remaining columns grounded, a detector on elements 10a, 10b and 10c must sense the difference between 2.0 ma for a white area flowing to virtual ground and 0.4 ma for a black area flowing to vertical ground.

Possible parallel paths place as little as 250 ohms (10,000/40) or as high as 1250 ohms in parallel with the detection impedance which therefore should be below 25 ohms to reduce signal shift to below 10%. The voltage signal generated across 25 ohms by 2.0 ma is 50 mV and the signal generated by 0.4 ma across 25 ohms is 10 mV. This gives an effective on signal to off signal of 5:1. The 50 mV to 10 mV swing is in the range where good signal to noise ratio is possible.

FIG. 2 illustrates one form of arrangement for the linear photoconductive member and conductor patterns associated therewith. The photoconductive member or bar is indicated at 20. At one side of the bar 20 extends a pattern of closely spaced electrical connectors 21, the connectors 21 being parallel and extending from beneath the bar 20 and being connected in columns or blocks to contact pads 22a to 22n. The connectors 21 correspond to connectors 11 of FIG. 1 while the contact pads 22a–22n correspond to the conductors 12a–12c and so on of FIG. 1.

On the other side of the bar 21 is a pattern comprising a plurality of parallel transverse electrical conductors 23a to 23n extending as rows across the substrate 24. From the conductors 23 extend electrical connectors 25. A connector 25 connects between each conductor 23 to the bar 20, the connector connecting to the bar in opposition to a connector 21. The connectors from a particular conductor 23 are spaced apart so that each connector 25 is connected to the bar opposite a connector 21 from a different contact pad 22. Thus, for example, assuming that twenty connectors 21 extend from each contact pad 22, the first conductor 23a is connected to the bar 20 by connectors 25 which are opposed to the first connector 21, then the twenty-first, forty-first and so. The next conductor 23b is connected to the second connector 21, the twenty-second, the forty-second and so on. This continues for each conductor 23. By this arrangement, by selection of a particular contact pad 22 and a particular conductor 23, an unique position on the bar 20 can be connected to a circuit. Contact pads 26 are provided at alternate ends of the conductors 23. In one method of forming the conductor patterns, the conductors 23 are formed on the substrate 24, a layer of electrically insulating material formed over the conductors and then the connectors 25 formed. Electrical connection is provided between connectors 25 and conductors 23 through vias formed in the insulating layer, the vias indicated at 27.

FIG. 3 illustrates to a larger scale a typical cross-section through the bar 20, connectors 21 and 25, conductors 23 and contact pads 22. Also shown in FIG. 3 is insulating layer 28, between connectors 25 and conductors 23.

In use as a detector or reading head, the device is connected via leads from the contact pads 22 and 26 to drive circuitry. The drive circuitry can be of conventional form and effectively connects each pad 22 to a particular potential and then sequentially connects each pad 26 to, for example, a unity gain switch, the switches connected to a level detection circuit. Light falling on the bar makes it conductive. Thus if a line of print is imaged on the bar 20, each picture element will be either photoconductive or non-conductive, depending upon whether the related portion of the image is white or black. By stepping connections to pads 22a–22n, and to pads 26, the whole bar can be scanned to produce a pattern of output pulses from the detector circuit indicative of white (or light) picture elements.

A particular process for producing a device as in FIGS. 2 and 3 is as follows. The electrical connectors 21 and 25 are formed by thin film techniques, either by first forming a patterned mask on the substrate 24 and then forming the conductors. Alternatively the substrate can be covered with the connector material and then the material photolithographically etched to produce the connectors. The layer of insulating material 28 is applied and then the through connection vias prepared. Conductors 23 are then formed by deposition through a mask, or by a layer which is photolithographically etched to produce the desired pattern. Conductors 23 can be thin film form. Again, as an alternative, the conductors 23 can be deposited by thick film techniques. Finally the photoconductive material forming the bar 20 is deposited. This can again be thin film techniques.

Instead of forming the insulating layer over the entire pattern of connectors 23, the layer can be in sections, the edge of a section inclined from the bar 20, to define the particular position on each connector 25 at which the conductor make contact with the particular connector. The conductors 23 could be formed first on the substrate 24, then the areas of insulating layer formed and then the connectors 25 formed.

One example of material for the bar 20 is cadmium selenide, and a further example is cadmium sulphide. The conductors and connectors can conveniently be of a three part layer; a first layer of titanium for good adhesion to the substrate, a second layer of palladium which gives good adhesion to the titanium and provides good adhesion for the third layer of gold. The three layers can be formed by evaporation.

The contact between the connectors and bar would normally be ohmic contacts with the materials described, but by appropriate choice of metal to semiconductor (bar) contacts, rectifying junctions can be provided. Such junctions would minimize any loop current problem in the detection circuitry. An example of a rectifying junction contact is a sandwich structure, with the photoconductor, for example, of cadmium sulphide contained between an Indium (metal) contact and tin oxide (semiconductor).

What is claimed is:

1. A photoconductor device for imaging a linear object, said photoconductor device comprising:
   an insulating substrate;
   an elongate bar of photoconductive material;
   a first plurality of parallel closely-packed equispaced thin film conductors extending from the bar in a first direction and having end contact regions overlain by one side edge of the bar;
   a second plurality of parallel, closely-packed, equispaced thin film conductors extending from the bar in a direction opposite to said first direction and having end contact regions overlain by the opposite side edge of the bar, the end contact regions of said first plurality of conductors being opposed to respective end contact regions of said second plurality of conductors whereby to produce a series of spaced pairs of contact regions extending, equispaced, along the photoconductive bar and wherein the junction between the bar and one contact region of each pair is an ohmic contact and the junction between the bar and the other contact region of each pair is a rectifying junction.

2. A photoconductive device as claimed in claim 1 in which each of the rectifying junctions is a sandwich structure with the photoconductive material contained between an indium contact layer and a tin oxide semiconductor layer.

3. A photoconductive device as claimed in claim 1, in which said second plurality of conductors is overlain with an insulating layer and the common terminals to which said second plurality of conductors are connected extend along at least one side of the substrate, each such terminal being connected to respective ones of said second plurality of conductors by a series of parallel intermediate conductors overlying said insulating layer, extending transversely over said second plurality of conductors, and electrically connected to said respective conductors by vias through the insulating layer.

4. A photoconductive device according to any of claims 1 through 3 in which each of the ohmic contacts comprises a first layer of titanium adjacent the substrate, a second layer of palladium and a third layer of gold.

* * * * *